United States Patent
Anderegg et al.

(10) Patent No.: US 11,046,385 B1
(45) Date of Patent: Jun. 29, 2021

(54) BICYCLE TRAILER HITCH FOR MOUNTING TO A BICYCLE SEAT POST

(71) Applicant: Burley Design LLC, Eugene, OR (US)

(72) Inventors: Jonathan Anderegg, Eugene, OR (US); Matthew Downing, Eugene, OR (US)

(73) Assignee: Burley Design LLC, Eugene, OR (US)

( * ) Notice: Subject to any disclaimer, the term of this patent is extended or adjusted under 35 U.S.C. 154(b) by 175 days.

(21) Appl. No.: 16/508,095

(22) Filed: Jul. 10, 2019

Related U.S. Application Data

(60) Provisional application No. 62/842,311, filed on May 2, 2019.

(51) Int. Cl.
 *B62K 27/12* (2006.01)
 *B62K 27/00* (2006.01)
 *F16B 2/10* (2006.01)

(52) U.S. Cl.
 CPC ............ *B62K 27/12* (2013.01); *B62K 27/003* (2013.01)

(58) Field of Classification Search
 CPC ... B62K 27/003; B62K 27/12; B62K 2206/00
 USPC ........................................................ 280/204
 See application file for complete search history.

(56) References Cited

U.S. PATENT DOCUMENTS

| 3,829,125 | A |   | 8/1974  | Davis |
|-----------|---|---|---------|-------|
| 3,848,890 | A |   | 11/1974 | MacAlpine |
| 3,934,666 | A |   | 1/1976  | Ellington |
| 4,037,853 | A | * | 7/1977  | Sparks .................... B62B 1/208 |
|           |   |   |         | 280/204 |
| 4,174,120 | A |   | 11/1979 | Freeman |
| 5,240,266 | A | * | 8/1993  | Kelley .................... B62K 27/12 |
|           |   |   |         | 280/204 |
| 5,242,178 | A |   | 9/1993  | Galasso et al. |
| 5,695,208 | A |   | 12/1997 | Baechler et al. |
| 5,785,335 | A |   | 7/1998  | George |
| 5,865,560 | A | * | 2/1999  | Mercat .................... B62K 25/02 |
|           |   |   |         | 403/322.4 |

(Continued)

FOREIGN PATENT DOCUMENTS

| AT | 514601 B1 | * | 2/2015 | ............. B62K 19/36 |
| CH | 233713 A  | * | 8/1944 | ............. B62K 27/06 |

(Continued)

OTHER PUBLICATIONS

Bike-Hod; trailer and hitch images and descriptions; obtained from website prior to Jul. 22, 2011; 6 pages.

(Continued)

*Primary Examiner* — Ruth Ilan
*Assistant Examiner* — Myles A Harris
(74) *Attorney, Agent, or Firm* — Klarquist Sparkman, LLP

(57) ABSTRACT

A bicycle trailer can easily be mounted to and dismounted from a bicycle seat post without requiring the use of tools. Pivotally interconnected first, second and at least one intermediate, segments are positioned around the seat post when the hitch is mounted thereto. A latch detachedly couples free end portions of the first and second segments together. A pivot for coupling to the towing arm of a bicycle trailer is coupled to one of the segments. Desirably the latch is capable of adjusting the distance between the free end portions to accommodate seat posts of different diameters. Cushions can project inwardly from the segments and into engagement with a seat post to which the hitch is mounted.

20 Claims, 6 Drawing Sheets

(56) References Cited

U.S. PATENT DOCUMENTS

| | | | |
|---|---|---|---|
| 6,099,008 A | 8/2000 | Caffey | |
| 6,286,847 B1 | 9/2001 | Perrin | |
| 6,290,246 B1 | 9/2001 | Lin | |
| 6,983,947 B2 | 1/2006 | Asbury et al. | |
| 7,131,657 B1 * | 11/2006 | Witt | B62K 27/003 |
| | | | 280/292 |
| 7,578,515 B2 * | 8/2009 | Appleman | B62K 15/00 |
| | | | 280/287 |
| 7,766,358 B1 | 8/2010 | Phillips | |
| 8,091,908 B2 | 1/2012 | Wilson et al. | |
| 8,128,103 B1 * | 3/2012 | Schutzendorf | B62B 7/008 |
| | | | 280/33.993 |
| 8,419,035 B2 | 4/2013 | Wilson et al. | |
| 2003/0193161 A1 * | 10/2003 | Turner | F16F 9/54 |
| | | | 280/276 |
| 2006/0186634 A1 * | 8/2006 | Giese | B62K 13/02 |
| | | | 280/292 |
| 2011/0068560 A1 * | 3/2011 | Wilson | B62K 27/12 |
| | | | 280/514 |
| 2012/0313345 A1 * | 12/2012 | Kamler | B62K 27/003 |
| | | | 280/292 |
| 2018/0326783 A1 * | 11/2018 | Thorpe | B62K 25/08 |
| 2020/0180726 A1 * | 6/2020 | Kozak | B62K 25/08 |

FOREIGN PATENT DOCUMENTS

| | | | | |
|---|---|---|---|---|
| CN | 107089290 A | * | 8/2017 | |
| DE | 202016100227 U1 | * | 4/2016 | B62K 27/12 |
| FR | 3004411 B1 | * | 9/2016 | B62D 63/064 |
| KR | 910000425 Y1 | * | 1/1991 | |
| WO | WO 2011/037756 | | 3/2011 | |
| WO | WO-2017178934 A1 | * | 10/2017 | F16G 13/18 |

OTHER PUBLICATIONS

Oxtail "The Trailer" trailer and hitch specifications; obtained from website prior to Jul. 22, 2011; 3 pages.

Roland models "Mini" and "Carrie M2" trailer and hitch specifications; obtained from website prior to Jul. 22, 2011; 3 pages.

Tony's Trailers "Grocery Getter" Model D; trailer and hitch specifications; obtained from website prior to Jul. 22, 2011; 5 pages.

Weber prior art hitch photographs; Model H; obtained prior to Jul. 22, 2011; 1 page.

Photo of Burley hitch; offered for sale and sold prior to May 2, 2018.

* cited by examiner

BICYCLE TRAILER HITCH FOR MOUNTING TO A BICYCLE SEAT POST

CROSS REFERENCE TO RELATED APPLICATION

This application claims the benefit of U.S. Provisional Application Ser. No. 62/842,311, entitled BICYCLE TRAILER HITCH FOR MOUNTING TO A BICYCLE SEAT POST, filed on May 2, 2019.

TECHNICAL FIELD

This disclosure relates to bicycle trailer hitches for coupling a bicycle trailer to a bicycle and more specifically to bicycle seat post mounted trailer hitches.

SUMMARY

A bicycle trailer hitch is disclosed that can easily be mounted to and dismounted from a bicycle seat post without requiring the use of tools. This allows the bicycle hitch to be switched quickly from a bicycle seat post of first bicycle to the bicycle seat post of a second bicycle should the rider of the second bicycle desire to tow a bicycle trailer.

Pivotally interconnected first, second, and at least one intermediate, segments are positioned around the seat post when the hitch is mounted thereto. A latch detachedly couples free end portions of the first and second segments together. A pivot for coupling to the towing arm of a bicycle trailer is coupled to one or more of the segments. Desirably the latch is capable of adjusting the distance between the free end portions of the first and second segments to accommodate seat posts of different diameters. Cushions can project inwardly from the segments and into engagement with a seat post to which the hitch is mounted.

In accordance with an embodiment, a bicycle trailer hitch for mounting to a bicycle seat post and for coupling a trailer towing arm and towed trailer to the bicycle seat post, the bicycle trailer hitch can comprise: a plurality of pivotally interconnected segments comprising a first segment, a second segment and at least one intermediate segment between the first and second segments, each segment comprising a bicycle post engaging interior side surface positioned to engage the bicycle seat post at least when the bicycle trailer hitch is mounted to the bicycle seat post; an over center latch coupled to the first segment and detachably coupled to the second segment, the over center latch being first segment and detachably coupled to the second segment, the over center latch being movable to first mounting position and to a second detached position, wherein in in the first mounting position the over center latch couples the first and second segments together and also couples the interior side surfaces of the first, second, and at least one intermediate segment to the bicycle seat post to mount the bicycle trailer hitch to the bicycle seat post, wherein in the second detached position the over center latch decouples the first and second segments from one another such that the first, second and at least one intermediate segment are free to pivot clear of the bicycle seat post to allow removal of the bicycle trailer hitch from the seat post; and a trailer towing arm supporting platform projecting outwardly from one of the first, second and the at least one intermediate segment; and a trailer towing arm pivot carried by the trailer towing arm supporting projection, the trailer towing arm pivot being adapted to pivotally couple the trailer towing arm to the bicycle trailer hitch during towing of the bicycle trailer.

As another aspect, a bicycle trailer hitch can include only one or two intermediate segments.

As a further aspect, the trailer towing arm pivot can comprise a pivot pin projecting upwardly from the towing arm supporting projection for insertion through an opening through the end portion of the trailer towing arm to pivotally couple the trailer towing arm to the bicycle trailer hitch. The bicycle trailer hitch can also include a trailer towing arm capture member slidably coupled to the towing arm supporting projection and slidable between a trailer towing arm captured position and a trailer towing arm released positions, wherein in the trailer towing arm capture position the trailer towing arm capture member is slid relative to the towing arm supporting platform to a position that overlies a portion of the end portion of the trailer towing arm to thereby retain the trailer towing arm coupled to the bicycle trailer hitch, and wherein in the trailer towing arm released position the trailer towing arm capture member is slid to a position that does not overlie a portion of the trailer towing arm to thereby allow decoupling of the trailer towing arm from the pivot pin and thereby from the bicycle trailer hitch.

As still another aspect, the trailer hitch can comprise a biasing spring coupled to the towing arm supporting projection and to the trailer towing arm capture member to bias the trailer towing arm capture member to the trailer towing arm captured position.

As yet another aspect, the first segment can comprise first and second end portions, the second end portion of the first segment being pivoted to at least one intermediate segment, wherein the second segment comprises first and second end portions, the second end portion of the second segment being pivoted to at least one intermediate segment. In addition, the over center latch can comprise a lever comprising a proximal end and a distal end, the proximal end being pivoted to the first end of the first segment for pivoting about a first latch pivot axis. The over center latch can also comprise a latching member having first and second latching member end portions, the first latching member end portion being pivotally coupled to the lever at a location spaced from the first latch pivot axis for pivoting about a second latch pivot axis that is parallel to the first latch pivot axis. The latching member can project from the lever toward the first end portion of the second segment, the second latching member end portion being adapted to detachably engage the first end portion of second segment, whereby upon rotating the distal end of the lever about the first pivot axis and away from the first end portion of the second segment to a lever latching position, the first end portion of the second segment is drawn toward the first end portion of the second segment and the second latch pivot axis is positioned at an over center position with the first latch pivot axis positioned between the first end portion of the second segment and the second latch pivot axis.

As an additional aspect, the first latching member end portion can be threadedly connected to the lever, wherein rotation of the latching member in a first direction increases the distance along the latching member from the second latch pivot axis to the first end portion of the second segment, and wherein rotation of the latching member in a second direction decreases the distance along the latching member from the second latch pivot axis to the first end portion of the second segment, whereby rotating the latching member adjusts the distance between the first end portion of the first segment and the first end portion of the second segment.

As a further aspect, the first end portion of the first segment can define a slot positioned to receive the latching member therein as the lever is moved to the lever latching position. The latching member can be t-shaped and comprise a leg that terminates at the first latching member end portion and a cross portion at the second latching member end portion. The first end portion of the second segment can comprise a slot positioned to receive a portion of the leg and with the cross portion engaging an engagement surface of the first end portion of the second segment that faces away from the second latch pivot axis. This engagement surface can be concave.

As additional aspects, the interior side surfaces of the first, second and at least one intermediate segments can comprise arcuate surfaces and they can be concave surfaces.

As still further aspects, the towing arm supporting projection can comprise a platform that projects outwardly from an exterior side surface of the first segment. In addition, the towing arm supporting platform can project at an upward angle from the first segment.

In accordance with an embodiment, a trailer hitch for mounting to a bicycle seat post and for coupling a trailer towing arm and towed trailer to the bicycle seat post can comprise: a first segment comprising a first body comprising a first segment first and second ends and a first segment interior side surface that faces the bicycle seat post when the hitch is mounted to the bicycle seat post; a second segment comprising a second body with second segment first and second ends and a second segment interior side surface that faces the bicycle seat post when the bicycle trailer hitch is mounted to the bicycle seat post; an intermediate segment comprising an intermediate body with intermediate segment first and second ends and an intermediate segment interior side surface that faces the bicycle seat post when the bicycle trailer hitch is mounted to the bicycle seat post; wherein the first segment second end is pivoted to the intermediate segment first end and the second segment second end is pivoted to the intermediate segment second end to form a chain of three pivotally interconnected segments; a lever comprising a proximal end and a distal end, a first lever pivot that pivots the proximal end of the lever to the first segment first end at a first lever pivot location, a latching member having first and second latching member end portions, a second lever pivot that pivots the first latching member end portion to the lever at a second lever pivot location spaced from the first lever first pivot location, the second lever end portion being positioned between the proximal and distal ends of the lever, the second latching member end being adapted to detachably engage the second segment first end, whereby upon rotating the distal end of the lever about the first lever pivot and away from the second segment first end portion to an over center lever latching position, the second segment first end is drawn toward the first segment first end and the first lever pivot location is positioned between the second segment first end and the second pivot location; and a trailer towing arm pivot coupled to one of the first, second and intermediate segments, the trailer towing arm pivot being adapted to pivotally couple the trailer towing arm to the bicycle trailer hitch during towing of the bicycle trailer.

As still further aspects, the first segment second end can be pivoted to the intermediate segment first end for pivoting about a first upright axis, the second segment second end can be pivoted to the intermediate segment second end for pivoting about a second upright pivot axis, wherein the first lever pivot pivots the proximal end of the lever to the first segment first end for pivoting about a first lever pivot axis, wherein the second lever pivot that pivots the first latching member end portion to the lever for pivoting about a second upright lever pivot axis, and wherein the first pivot axis, the second pivot axis, the first lever pivot axis and the second lever pivot axis are parallel.

As further aspects, the first segment interior side surface, the second segment interior side surface and the third segment interior side surface can each comprise an arcuate or a concave surface.

As an additional aspect, the first latching member end portion can be threadedly and pivotally coupled to the lever at the second lever pivot location.

As still further aspects, the trailer hitch can comprise a platform projecting outwardly from said one of the first segment, second segment and intermediate segment to which the trailer arm pivot is coupled, wherein the trailer arm pivot comprises a pivot pin projecting upwardly from the platform for insertion through an opening through the end portion of the trailer towing arm to thereby pivotally couple the trailer towing arm to the bicycle trailer hitch, a trailer towing arm capture member slidably coupled to the platform and slidable between a trailer towing arm captured position and a trailer towing arm released position, wherein in the trailer towing arm capture position the trailer arm capture member is slid relative to the platform to a position that overlies a portion of the end portion of the trailer towing arm to thereby retain the trailer towing arm coupled to the bicycle trailer hitch, and wherein in the trailer towing arm released position the trailer towing arm capture member is slid to a position that does not overlie a portion of the trailer towing arm to thereby allow decoupling of the trailer towing arm from the pivot pin and thereby from the bicycle trailer hitch. In addition, a biasing spring can be coupled to the towing arm supporting platform and to the trailer towing arm capture member to bias the trailer towing arm capture member to the trailer towing arm captured position.

As yet another aspect, a towing arm supporting platform can project outwardly from the second segment.

As still further aspects, a bicycle trailer hitch can comprise a first cushion carried by the first segment and projecting from first segment interior side surface toward the bicycle seat post when the hitch is mounted to the bicycle seat post, a second cushion carried by the second segment and projecting from the second segment interior side surface toward the bicycle seat post when the hitch is mounted to the bicycle seat post, and a third cushion carried by said intermediate segment and projecting from the intermediate segment interior side toward the bicycle seat post when the hitch is mounted to the bicycle seat post.

In accordance with an embodiment, a bicycle trailer hitch for mounting to a bicycle seat post and for coupling a trailer towing arm and towed trailer to the bicycle seat post, the bicycle trailer hitch can comprise: a plurality of pivotally interconnected segments comprising a first segment, a second segment and one intermediate segment between the first and second segments, each segment comprising a bicycle post engaging interior side surface positioned to engage the bicycle seat post at least when the bicycle trailer hitch is mounted to the bicycle seat post; an over center latch coupled to the first segment and detachably coupled to the second segment, the over center latch being movable to first mounting position and to a second detached position, wherein in in the first mounting position the over center latch couples the first and second segments together and also couples the interior side surfaces of the first, second, and said one intermediate segment to the bicycle seat post to mount the bicycle trailer hitch to the bicycle seat post, wherein in the second mounting position the over center latch decouples the first and second segments from one another such that the first, second and said one intermediate segment are free to pivot clear of the bicycle seat post to allow removal of the bicycle trailer hitch from the seat post; a trailer towing arm supporting platform projecting outwardly from one of the first, second and said one intermediate segment; and a trailer towing arm pivot carried by the trailer towing arm supporting platform, the trailer towing arm pivot being adapted to pivotally couple the trailer towing arm to the bicycle trailer hitch during towing of the bicycle trailer; wherein the trailer towing arm pivot comprises a pivot pin projecting upwardly from the towing arm supporting platform for insertion through an opening through the end portion of the trailer towing arm to pivotally couple the trailer towing arm to the bicycle trailer hitch, a trailer towing arm capture member slidably coupled to the towing arm supporting platform and slidable between a trailer towing arm captured position and a trailer towing arm released positions, wherein in the trailer towing arm capture position the trailer towing arm capture member is slid relative to the towing arm supporting platform to a position that overlies a portion of the end portion of the trailer towing arm to thereby retain the trailer towing arm coupled to the bicycle trailer hitch, and wherein in the trailer towing arm released position the trailer towing arm capture member is slid to a position that does not overlie a portion of the trailer towing arm to thereby allow decoupling of the trailer towing arm from the pivot pin and thereby from the bicycle trailer hitch; a biasing spring coupled to the towing arm supporting platform and to the trailer towing arm capture member to bias the trailer towing arm capture member to the trailer towing arm captured position; wherein the first segment comprises first and second end portions, the second end portion of the first segment being pivoted to said one intermediate segment and the second segment comprises first and second end portions, the second end portion of the second segment being pivoted to said one intermediate segment, the over center latch comprising a lever comprising a proximal end and a distal end, the proximal end being pivoted to the first end of the first segment for pivoting about a first latch pivot axis, a latching rod having first and second rod end portions, the first rod end portion being pivotally coupled to the lever at a location spaced from the first latch pivot axis for pivoting about a second latch pivot axis that is parallel to the first latch pivot axis, the latching rod projecting from the lever toward the first end portion of the second segment, the second rod end portion being adapted to detachably engage the first end portion of second segment, whereby upon rotating the distal end of the lever about the first pivot axis and away from the first end portion of the second segment to a lever latching position, the first end portion of the second segment is drawn toward the first end portion of the second segment and the second latch pivot axis is positioned at an over center position with the first latch pivot axis positioned between the first end portion of the second segment and the second latch pivot axis; wherein the first latching rod end portion is threadedly connected to the lever, wherein rotation of the latching rod in a first direction increases the distance along the latching rod from the second latch pivot axis to the first end portion of the second segment, and wherein rotation of the latching rod in a second direction decreases the distance along the latching rod from the second latch pivot axis to the first end portion of the second segment, whereby rotating the latching rod adjusts the distance between the first end portion of the first segment and the first end portion of the segment; wherein the first end portion of the first segment defines a slot positioned to receive the latching rod therein as the lever is moved to the lever latching position, and wherein the latching rod is t-shaped have having a leg that terminates at the first rod end portion and a cross portion at the second rod end portion, the first end portion of the second segment comprising a slot positioned to receive a portion of the leg and with the cross portion engaging an engagement surface of the first end portion of the second segment that faces away from the second latch pivot axis; wherein the interior side surfaces of the first, second and said one intermediate segments comprise arcuate surfaces; a first cushion carried by the first segment and projecting from the interior side surface of the first segment toward the bicycle seat post when the hitch is mounted to the bicycle seat post, a second cushion carried by the second segment and projecting from the interior side surface of the second segment toward the bicycle seat post when the hitch is mounted to the bicycle seat post, a third cushion carried by said one intermediate segment and projecting from the interior side surface of said one intermediate segment toward the bicycle seat post when the hitch is mounted to the bicycle seat post; and wherein the towing arm supporting platform projects an upward angle from the first segment.

The invention includes the all possible novel and non-obvious combinations and sub-combinations of the above aspects and portions thereof and as disclosed below and in the drawings. The invention is not limited to the specific exemplary embodiment described herein.

DETAILED DESCRIPTION

Throughout this disclosure, when a reference is made to a first element being coupled to a second element, the term "coupled" is to be construed to mean both direct connection of the elements as well as indirect connection of the elements by way of one or more additional intervening elements. Also, the singular terms "a", "and", and "first", mean both the singular and the plural unless the term is qualified to expressly indicate that it only refers to a singular element, such as by using the phrase "only one". Thus, for example, if two of a particular element are present, there is also "a" or "an" of such element that is present. In addition, the term "and/or" when used in this document is to be construed to include the conjunctive "and", the disjunctive "or", and both "and" and "or". Also, the terms "includes" and "has" have the same meaning as "comprises" and the terms "including" and "having" have the same meaning as "comprising". The terms "upper" and "lower" are used for convenience in describing a towing coupler in the orientation of FIG. 2, it being understood that, for example, the upper surfaces of components in FIG. 2 will still be upper surfaces even if the orientation of the bicycle trailer hitch is changed to place the upper surfaces of FIG. 2 in a different orientation from the orientation shown in FIG. 2.

FIGS. 1-6 illustrate an exemplary form of bicycle trailer hitch adapted for coupling to a bicycle seat post in accordance with this disclosure. The disclosure is not limited to this specific embodiment. Throughout this disclosure, the same numbers are used for common elements in the illustrated views of the bicycle trailer hitch.

Figure 1:
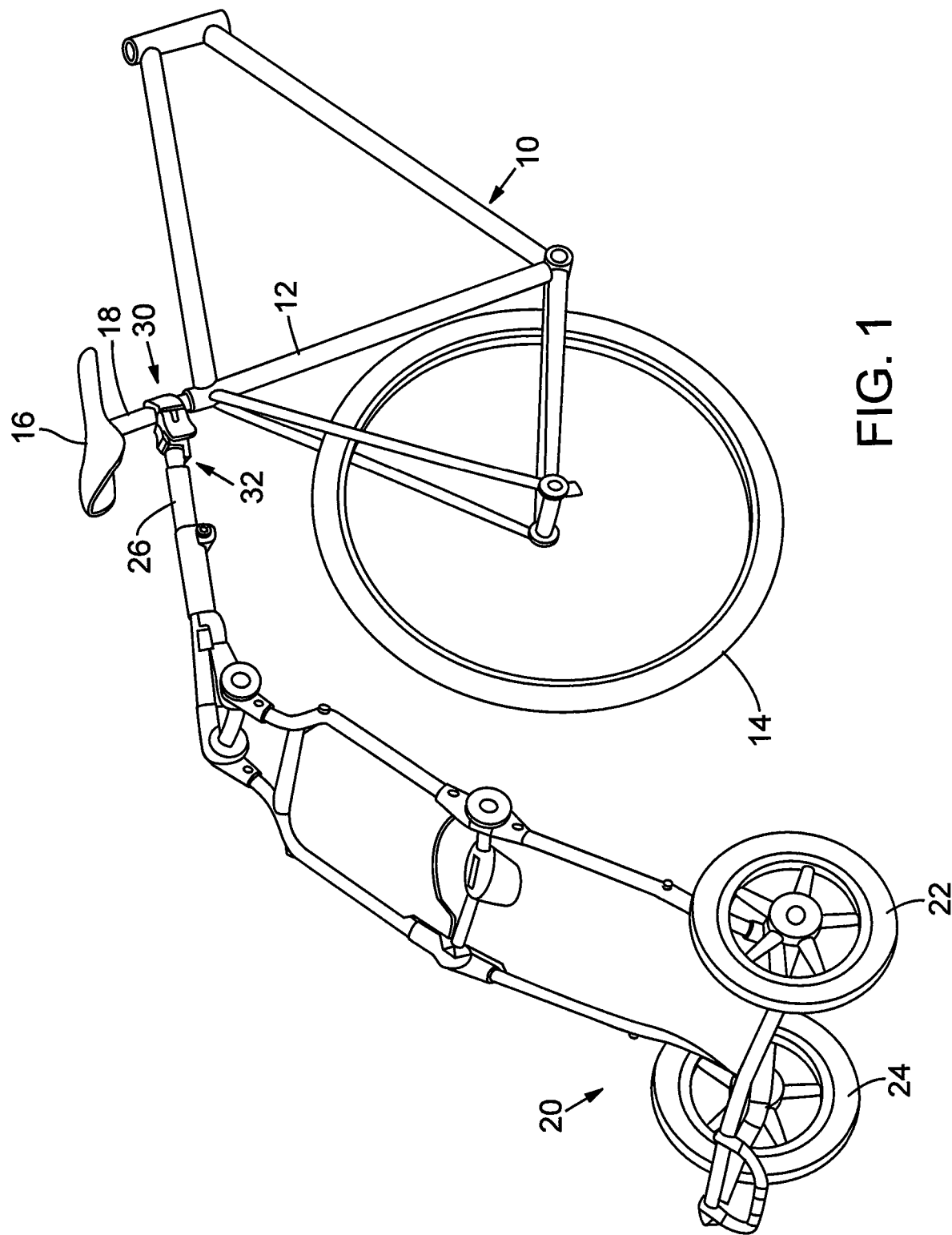
FIG. 1 is a view of a portion of a bicycle with a seat and seat post and shown towing an exemplary bicycle trailer. A trailer towing arm is coupled an embodiment of a bicycle hitch in a accordance with this disclosure to the seat post of the bicycle.

FIG. 1 illustrates a portion of a bicycle 10 comprising a bicycle frame 12, rear wheel 14 and a seat 16 supported by a seat post 18. The seat post is coupled to the frame 12. In addition, an exemplary bicycle trailer 20 is shown having wheels 22, 24 and a bicycle towing arm 26 for coupling to the bicycle. In FIG. 1, an embodiment of an exemplary bicycle trailer hitch 30, in accordance with this disclosure, is shown coupled to the bicycle post 18. The bicycle trailer towing arm 26 is pivoted to the bicycle trailer hitch 30 at a pivot indicated generally by the number 32. Consequently, as a bicyclist rides the bicycle with the trailer and towing arm coupled to the hitch, the trailer follows the bicycle as it travels.

Figure 2:
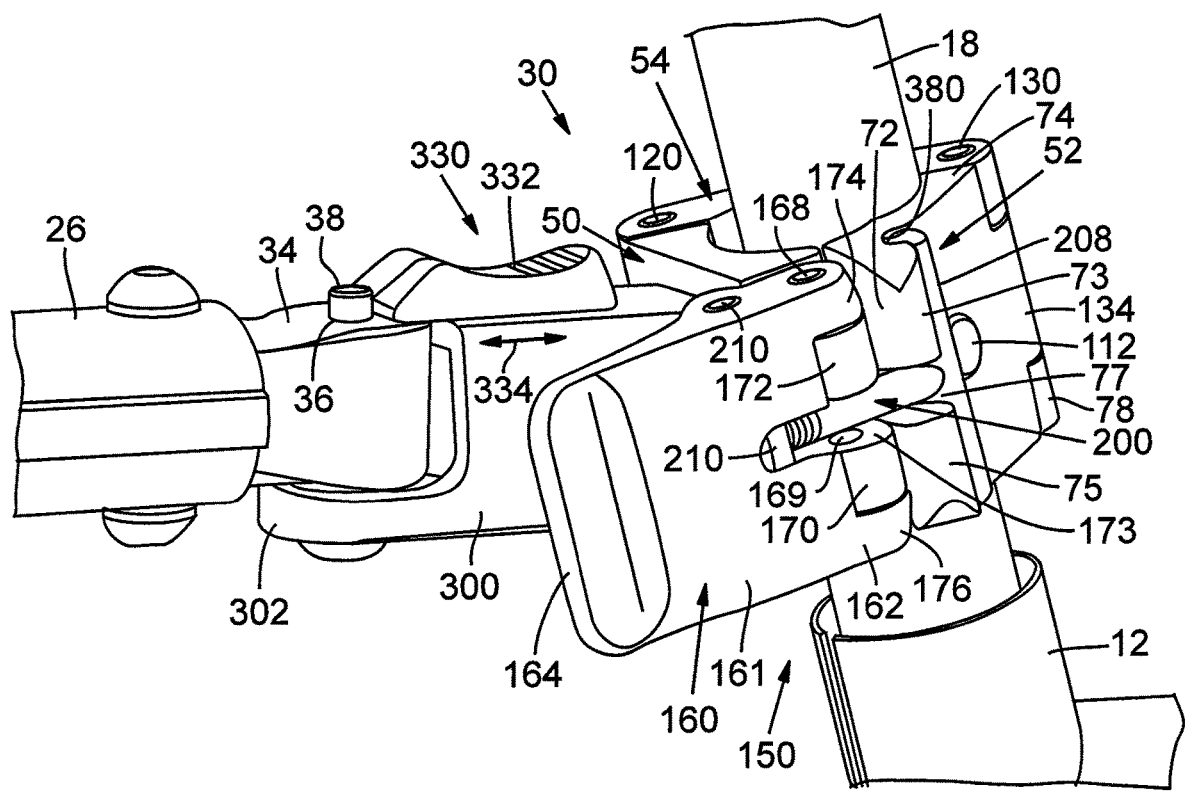
FIG. 2 is a view of the bicycle trailer hitch of FIG. 1 showing the bicycle trailer hitch in a latched state on the bicycle seat post.

Although a variety of pivots can be used to couple the bicycle towing arm 26 to the bicycle trailer hitch, as shown in the example in FIG. 2, the bicycle trailer towing arm 26 can comprise a front portion 34 having a generally upright opening 36 extending therethrough. A pivot such as a pivot pin 38 is coupled to the bicycle trailer hitch 30, as explained in greater detail below. When the bicycle trailer towing arm 26 is in place with the pin 38 inserted through the opening 36, the bicycle trailer towing arm, and hence the bicycle trailer, is pivotal about an upright axis through the pin 38.

Figure 3:
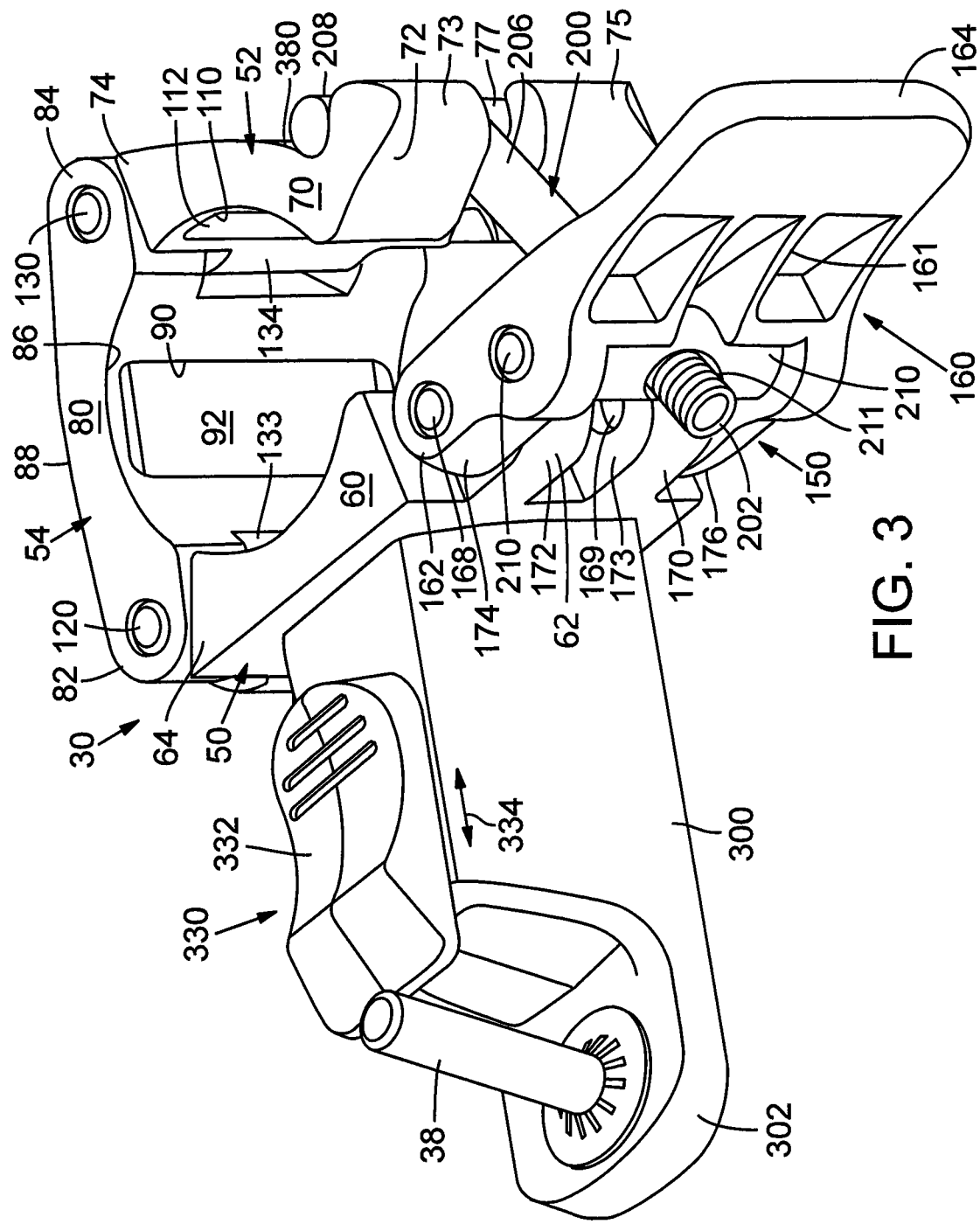
FIG. 3 is a view of the bicycle trailer hitch of FIG. 1 in an unlatched state prior with a latching member freed for decoupling segments of the bicycle trailer hitch from one another to allow the removal of the bicycle trailer hitch from the seat post.
Figure 4:
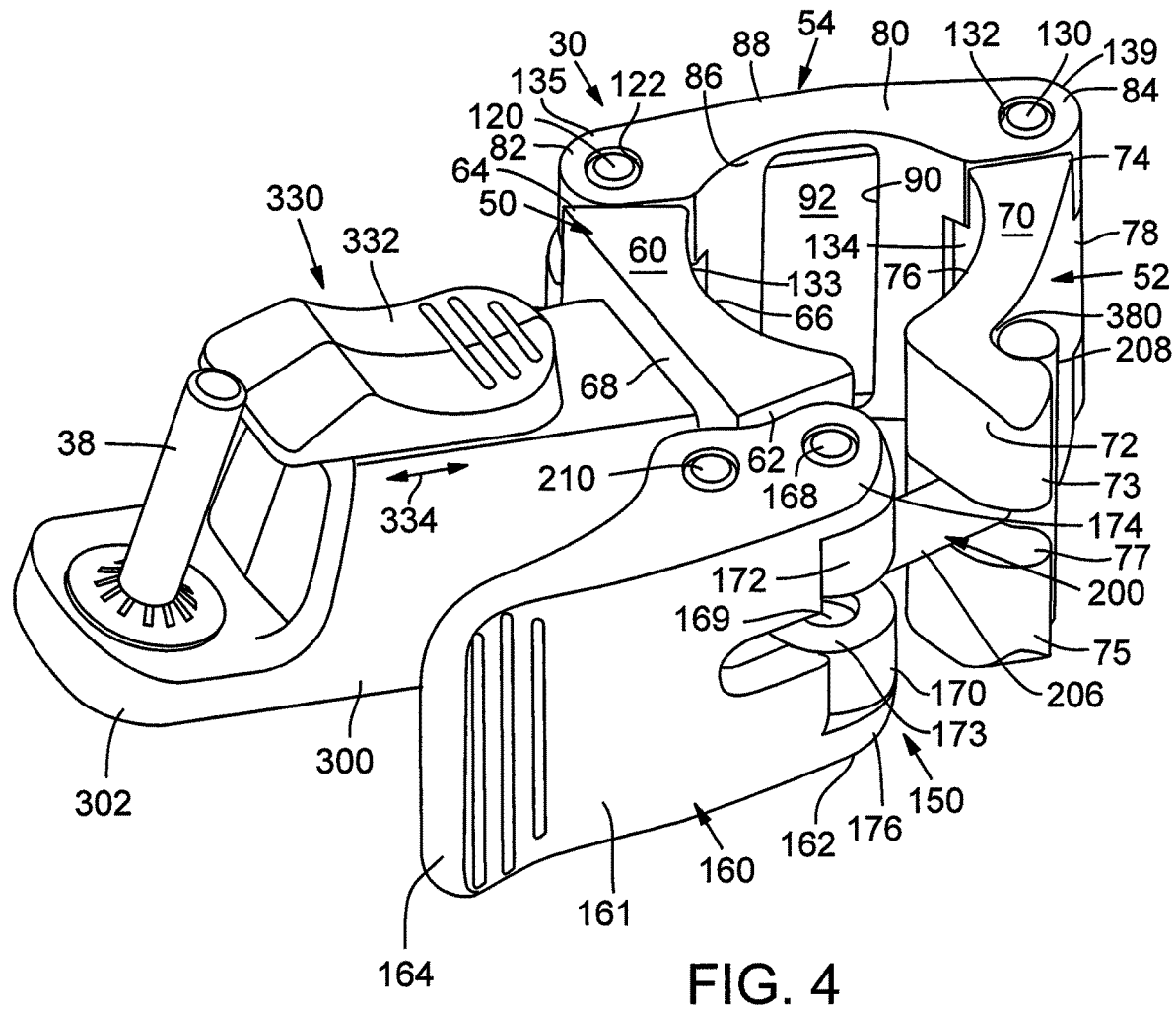
FIG. 4. is a perspective view of the bicycle trailer hitch of FIG. 2 with the bicycle seat post omitted.

With further reference to FIGS. 2, 3 and 4, the bicycle trailer hitch 30 can comprise a plurality of pivotally interconnected segments. For example, the bicycle trailer hitch can comprise a first segment 50, a second segment 52 and at least one intermediate segment 54 positioned between the first and second segments. In the example of FIG. 4, there is only one such intermediate segment: As another option, two such intermediate segments, or four segments total, can be included. It should be noted that although segment 50 has been designated as a first segment and segment 52 has been designated as a second segment, either one of these segments can be deemed the first segment.

Figure 5:
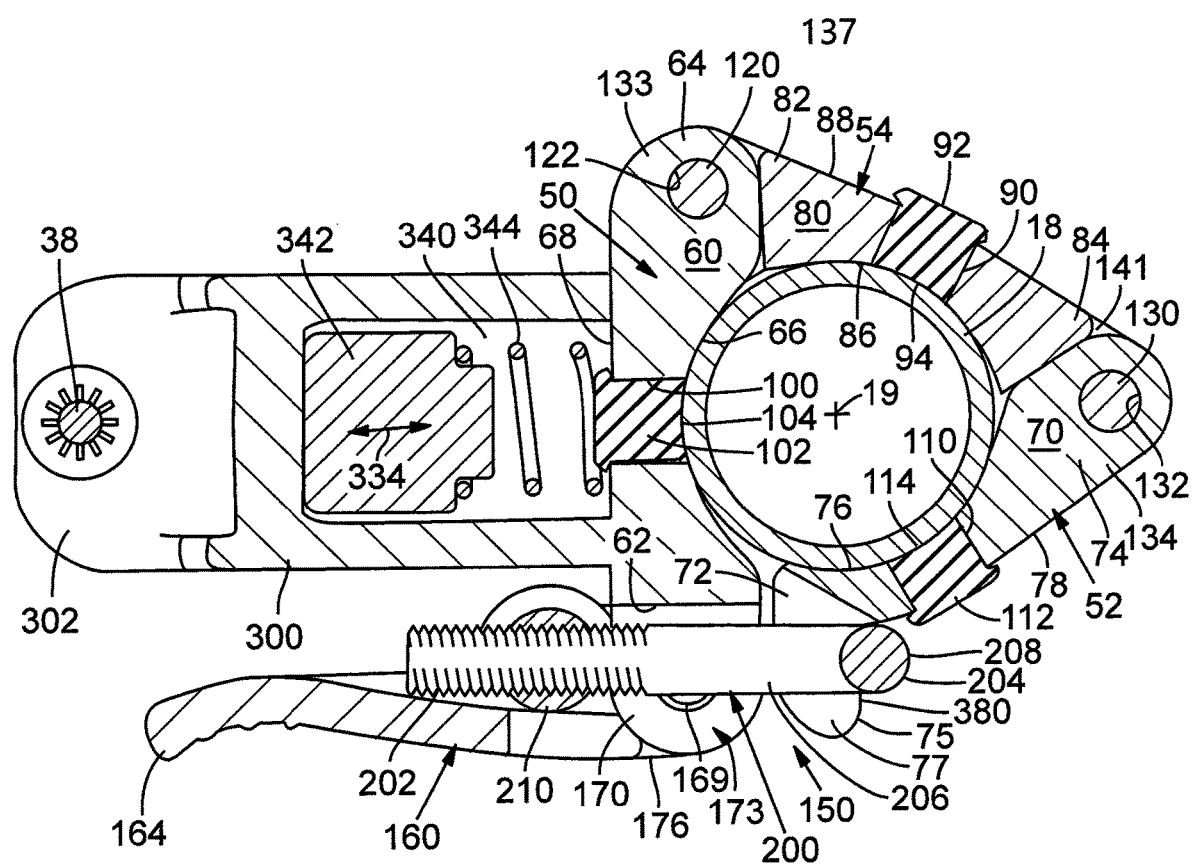
FIG. 5. is a horizontal sectional view, looking down, of the bicycle trailer hitch of FIG. 2 and with the bicycle seat post in position.

With reference to FIGS. 3, 4 and 5, the segment 50 can comprise a body 60 having respective opposed top and bottom surfaces, a first end or end portion 62 and a second end or end portion 64. The body further can comprise an interior side surface 66 and an exterior side surface 68. In the illustrated embodiment, the interior side surface 66 desirably comprises or consists of an arcuate surface or a concave surface.

The segment 52 can comprise a body 70 having a first end or end portion 72, a second end or end portion 74, and opposed top and bottom surfaces. In addition, the segment 52 can comprise an interior side surface 76 and an opposed exterior side surface 78. The interior side surface 76, like the interior side surface 66, can comprise or consist of an arcuate or concave surface.

In addition, the one or more intermediate segments, in this example one such intermediate segment 54, can comprise a body 80 comprising a first end portion or end 82 and a second end portion or end 84. The body 80 has opposed upper and lower surfaces. In addition, the body 80 can comprise an interior side surface 86 and an exterior side surface 88. The interior side surface 86 can comprise or consist of an arcuate or concave surface.

The arcuate or concave side surfaces of the segments are desirably curved or concave relative to an upright axis through the center 19 (FIG. 5) of the bicycle seat post 18.

The interior side surfaces 66, 78 and 86 of the respective segments 50, 52 and 54 desirably face inwardly toward the bicycle seat post 18 when the bicycle trailer hitch 30 is coupled to or mounted to the bicycle seat post as shown in FIGS. 2 and 5.

The segments can have an interiorly formed recess in the respective interior surfaces with a cushion or pad inserted therein. The cushion or pad can comprise a compressible material such as rubber press fit into the recesses formed in the respective interior surfaces of the segments, or otherwise secured thereto. These recesses can comprise openings that extend entirely through the respective segments from the interior surface to the exterior surface thereof.

An exemplary recess 90 is shown in FIG. 4 for receiving a cushion 92, the recess 90 being provided in the segment 54. As best seen in FIG. 5, in a specific example, the recess 90 comprises an opening extending from the interior surface 86 of segment 54 to the exterior surface 88 thereof. The cushion 92 comprises an upright cushion extending from a location adjacent to the bottom surface of segment 54 to a location adjacent to the top surface of segment 54. The interior surface 94 of cushion 92 desirably abuts the exterior surface of the bicycle seat post 18 when the hitch is coupled in a latched position to the seat post as shown in FIG. 5. With further reference to FIG. 5, a similar recess 100 is provided in or through the segment 50. A cushion 102, which can be like the cushion 92, is positioned in the opening 100 with the interior surface of the cushion 104 abutting the exterior surface of the bicycle seat post when the latch is clamped to the seat post as shown in FIG. 5. Also, the segment 52 can comprise a recess 110 extending in or through the segment 52, such as from the interior surface to the exterior surface of the segment 52. A cushion 112, which can also be like cushion 92, is positioned in the recess 110. When the bicycle trailer hitch is clamped as shown in FIG. 5, the interior surface of the cushion 112 can bear against or abut the exterior surface of the bicycle seat post. As seen in FIG. 5, the cushions 92, 102 and 112 can be centrally positioned between the respective ends of the segments. The interior surfaces of the cushions can be configured to match or interfit with the adjacent surfaces of the bicycle post. Such interior cushion surfaces can comprise or consist of arcuate or concave surfaces oriented about the axis through the center 19 (FIG. 5) of the bicycle seat post 18.

Referring again to FIGS. 2-4, the second end portion 64 of the segment 50 can be hinged to or otherwise pivoted to the first end portion 82 of the intermediate segment 54. In addition, the second end portion of the segment 52 can be hinged to or otherwise pivoted to the second end portion 84 of the segment 54. If more than one intermediate segment is included, the intermediate segments are pivoted together at their adjacent ends and the first and second segments are pivoted to respective adjacent ends of the intermediate segments.

In a specific example, the intermediate segment 54 can have a slot at each of its respective ends into which a projection of the respective adjacent segment 50, 52 is inserted. Openings through the slot defining portions of the segment 54 and the inserted hinge portions of the respective segments 50, 52 can be aligned with one another. When so aligned, a pivot pin can be inserted in each of the respective aligned set of openings to pivotally couple these segment end portions together for pivoting about respective pivot axes.

For example, with reference to FIGS. 4 and 5, end portion 82 of intermediate segment 54 can have upper and lower spaced apart hinge barrels or sections 135 (FIG. 4) and 137 (FIG. 5) separated by a gap into which a hinge barrel or projecting portion 133 of the end portion 64 of the segment 50 can be positioned. Openings through these barrel sections or projections are aligned to form an opening 122 into which a pivot pin 120 is inserted to pivotally interconnect these barrel sections or projections and thereby pivotally interconnect the second end of the segment 50 and the first end of the segment 54. The pin 120 comprises a pivot axis, and more specifically an upright pivot axis in this example, about which the segments 50, 54 may pivot relative to one another. In the same manner, second end portion 84 of intermediate segment 54 can have upper and lower spaced apart hinge barrels or projections 139 (FIG. 4) and 141 (FIG. 5) separated by a gap into which a hinge barrel or projecting portion 134 of the end portion 74 of the segment 52 can be positioned. Openings through these barrel sections or projections are aligned to form an opening 132 into which a pivot pin 130 is inserted to pivotally interconnect these barrel sections or projections and thereby pivotally interconnect the second end of the segment 52 and the second end of the segment 54. The pin 130 comprises a pivot axis, and more specifically an upright pivot axis in this example, about which the segments 52, 54 may pivot relative to one another. The pin 130 pivotally couples the respective second end portions of the segments 52, 54. In this example, the pivot axes through pins 120 and 130 are parallel to one another.

In the embodiments of FIGS. 2-5, an over center latch 150 is coupled to the first segment, such as segment 50 and detachably coupled to a second segment, such as the segment 52. The over center latch 150 is movable to a first mounting position shown in FIG. 4 and to a second detached position which corresponds to the position shown in FIG. 3 except that a latching member, such as member 200, as explained below, can be totally detached from the second segment 52 to allow the segments 50 and 52 to pivot about the pivot axes of pins 120, 130 away from one another and to allow the complete removal of the segments and bicycle trailer hitch 30 from the bicycle seat post 18. When in the first mounting position, the over center latch 150 couples the respective first end portions 62, 72 of the segments 50, 52 together and also couples the interior surfaces of the first, second and at least one intermediate segment 50, 52 and 54 to the bicycle seat post 18 to thereby mount the bicycle trailer hitch to the bicycle seat post. This is best seen in FIG. 5. In this position, the cushions 92, 102 and 112 are shown bearing against the bicycle trailer post. In addition, portions of the respective interior side 66, 76 and 86 surfaces of the segments 50, 52 and 54 can also abut the exterior surface of the bicycle seat post. However, the cushions can be sized such to space the interior side surfaces of the segments from the bicycle seat post. In the illustrated exemplary construction, the interior side surfaces of the cushions can also be considered as portions of the interior side surfaces of the respective segment.

As can be seen in FIGS. 2, 3 and 4, the over center latch 150 can comprise a lever 160. The lever 160 can include a proximal end portion 162 and a distal end portion 164. The proximal end portion 162 can be pivoted to the first end portion 62 of the first segment 50 (if the segment 50 is considered as the first segment). Lever 160 is thus pivotal relative to the segment 50 about a first latch pivot axis.

In the illustrated example, the proximal end portion 162 of lever 160 can comprise upper and lower shoulder portions or flanges 174, 176 that are spaced apart by a gap therebetween. In addition, the end portion 62 of the segment 50 can also comprise upper and lower shoulder portions of flanges 170, 172 that are spaced apart from one another with a gap 173 therebetween. The flanges 170, 172 of the end portion 62 of segment 50 can be positioned between the flanges 174, 176 of the proximal end 162 of the lever 160. A pivot couples the lever to the segment 50 for pivoting the proximal end portion of the lever about a first latch pivot axis that is upright and desirably parallel to the pivot axes defined by the pins 120, 130. In the illustrated example a first upper pin 168 pivotally couples the flanges 172, 174 together and a second lower pin 169 pivotally couples the flanges 170, 176 together with the pins 168, 169 defining the first pivot axis. The gap 173 is available to receive a latching member in this exemplary construction.

In illustrated embodiment, and with reference to FIGS. 4 and 5, one form of a latching member 200 is shown. The exemplary latching member 200 comprises first and second latching member end portions 202, 204 as best seen in FIG. 5. The latching member can be a band, a rod or another elongated structure, and in a specific example can comprise a T-shaped structure having a leg 206 and a cross member portion 208.

In this example, the leg 206 is positioned in the gap 173 between the upper and lower projecting portions 172, 170 of the segment 50. The leg 206 of the latching member is coupled to a pin 210, which is best seen in FIG. 3. The pin 210 defines a second latch pivot axis parallel to the first latch pivot axis defined by the pins 168, 169. The second latch pivot axis is carried by the lever body 161 and is positioned between the proximal and distal ends 162, 164 of the lever 160. The axes through pin sections 168 and 210 can be upright, parallel to one another and parallel to the axes through pins 120 and 130. The pin 210 can have an opening 211 therethrough. The leg end portion 202 is inserted through the opening 211. The pin 210 is coupled to the leg portion 206 of the latching member 200 such that the first latching member end portion of the latching member, in this example end portion 202 of member 200, can pivot with the pin 210 as the pin 210 is pivoted.

In a desirable form, the first latching member end portion can be threadedly coupled to the pin 210. As a result, rotation of the latching member 200 in a first direction (when the end portion 204 of the latching member is free of segment 52) reduces the distance between the pivot 210 and the end 204 of the latching member. Rotation of the latching member in a second direction opposite to the first direction increases this distance. By increasing this distance, the end portions 62, 72 of the segments 50, 52 can be spaced apart a greater distance to accommodate and mount to bicycle seat posts of a greater diameter or cross-sectional dimension than if the distance were not increased. In contrast, by decreasing this distance, the end portions 62, 72 of the segments 50, 52 can be spaced apart a shorter distance to accommodate and mount to bicycle seat posts of a smaller diameter or cross-sectional dimension than if the distance were not increased. In addition, the tension between the end portions of the segments 50, 52 when coupled together and mounted to a bicycle seat post by the over center latch can be changed.

That is, shortening the distance increases the tension and lengthening the distance decreases the tension.

With reference to FIG. 3, the end portion 72 of segment 52 can have upper and lower end sections 73, 75 separated by a gap 77. In the construction shown, the leg 206 of the latching member 200, and more specifically the second end portion 204 of the leg is positioned in the gap 77 with a distal or second end 208 of the latching member located rearwardly of the end portion 72; and more desirably against the engaging surface 380 of the rear surface of segment 52. End 208 of the latching member can comprise a cross member that is perpendicular to the leg 206. The surface portion 380 of the segment 52 is engaged by the second end 208 of the latching member 200 when the latch 150 is in the latched position shown in FIGS. 2 and 5, and also when in an intermediate partially closed position shown in FIG. 3. The surface 380 can comprise a concave engagement surface that assists in retaining a cross member portion 208 of a latching member, if a cross member portion is utilized, in engagement with the end portion 72 of the segment 52 when the over center latch 150 is in the latched position.

Figure 6:
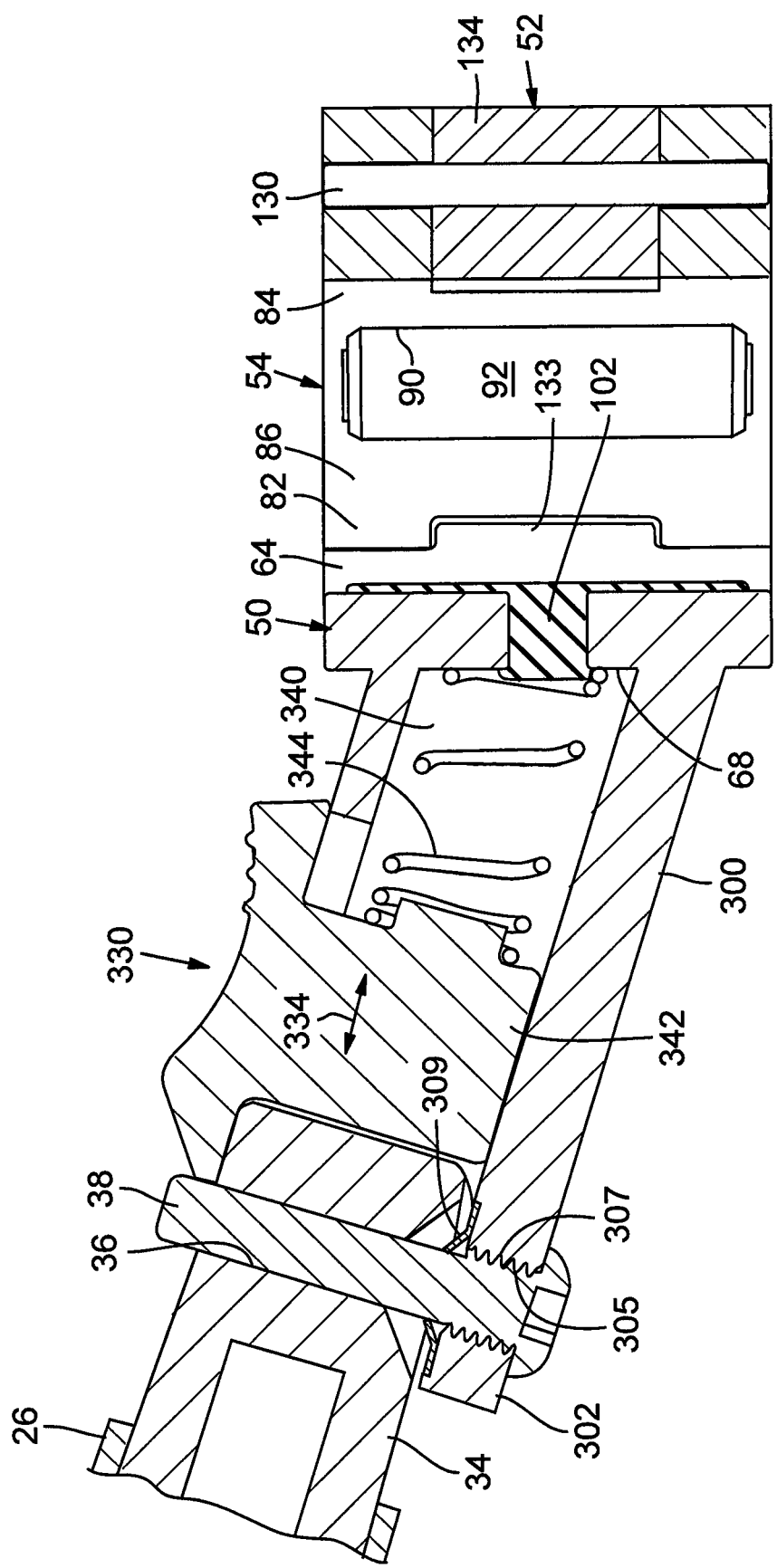
FIG. 6 is a vertical sectional view of the bicycle trailer hitch of FIG. 2 with the bicycle seat post removed.

With further reference to FIGS. 4-6, the bicycle trailer hitch 30 can comprise a projection 300 coupled to one of the segments, such as projecting outwardly from the rear surface 68 of the segment 50. The projecting portion 300 can be coupled to other segments instead, but desirably the hitch is turned on the bicycle seat post to orient the portion 300 to project rearwardly when mounted to the bicycle seat post 18. This orientation positions the towing arm pivot 38 at a desired location for receiving the towing arm of a trailer. In addition, the projecting portion can project rearwardly and upwardly from the segment to which it is coupled, such as segment 50 (See. FIG. 6). The projecting portion and segment to which it is coupled can comprise a monolithic integrated one-piece element. The segments 50, 52 and 54 are of a durable material; and can, for example, be of plastic [such as polyvinyl chloride (PVC)] or metal, with aluminum and steel being specific examples.

In the embodiment of FIGS. 4, 5 and 6, the projecting portion 300 can comprise a trailer towing arm supporting platform 302 projecting outwardly from one of the segments, in this example rearwardly from the segment 50. As can be seen in FIG. 2, the trailer towing arm 26, and more specifically end portion 34 of the trailer towing arm 26, is pivotally supported by the platform 302 for pivoting movement about the axis of the pin 38. The pin 308 can be a threaded pin with threads 307 adjacent to a head of the pin with threads 305 in a pin receiving opening of the platform 302 threadedly receiving the pin. A lock washer or pin retainer 309 engages the pin at the upper surface of the platform and comprises an upper surface facing the lower surface of the trailer towing arm portion 34. The lower surface can comprise a frustoconical recess that provides clearance between towing arm portion 34 and the retainer 309.

The bicycle trailer hitch 30 can also comprise trailer towing arm capture member and can be slidedly coupled to the towing arm supporting platform and slidable between a trailer towing arm captured position and a trailer towing arm released position. FIGS. 2 and 3, for example, illustrate one form of a trailer towing arm capture member. In this form, the capture member comprises a retaining button 332 slidably coupled to the projection 300 and thereby to the platform 302. The button 332 is slidable in the directions indicated by double headed arrow 334 in FIGS. 2-6 toward and away from the pin 38. In FIG. 2, the button 332 is shown in its capture position overlying a portion of the bicycle towing arm, in this case a portion of the end portion 34 of the bicycle towing arm.

As best seen in FIGS. 5 and 6, the projecting portion 300 can define an interior hollow chamber 340. An interior portion of the button 332, indicated at 342, is slidable within the chamber 340. A biasing spring 344 can be included to bias the button 332 against the interior surface 68 of segment 50 and urge the button toward the captured position (to the left in FIGS. 5 and 6). The button 332 can be slid, for example manually, toward the segment 50 to a position which clears, that is no longer overlies any portion of, the trailer towing arm such that the trailer towing arm can be removed from the pin 38 and freed from the bicycle trailer hitch 30.

In operation, the segments 50, 52 and 54 are positioned to surround the seat post except for a gap between the first ends 62, 72 of the segments 50, 52. The latching member 200 is positioned as shown in FIG. 2 with a portion thereof engaging the exterior side surface 380 of the segment 52. The length the latching member is adjusted (assuming the optional adjustability option is provided) for the seat post 18. Upon rotating the distal end 164 of the lever 160 about the first latch pivot axis of pivot pins 168, 169, and away from the first end portion 72 of the segment 52, the first end portion 72 of the segment 52 is drawn toward the first end portion 62 of the segment 50. Eventually, this pivoting action positions the over center latch 150 in a latched position. In the latched position (See FIGS. 4 and 5) the second latch pivot axis 210 is positioned at an over center position and the pivot axis through pins 168, 169 is positioned between the first end portion 72 of the segment 52 and the second latch pivot axis through pin 210.

Having illustrated and described the principles of my invention with reference to an exemplary embodiment. The disclosure is not limited to this embodiment and includes all novel and non-obvious combinations and sub-combinations of elements disclosed herein and related methods. It should be apparent to those of ordinary skill in the art that the disclosed coupler can be modified in arrangement and detail without departing from the inventive principles disclosed herein. I claim all such variations which fall within the scope of the claims.

The invention claimed is:

1. A bicycle trailer hitch for mounting to a bicycle seat post and for coupling a trailer towing arm and towed trailer to the bicycle seat post, the bicycle trailer hitch comprising;
   a plurality of pivotally interconnected segments comprising a first segment, a second segment and at least one intermediate segment between the first and second segments, each segment comprising a bicycle post engaging interior side surface positioned to engage the bicycle seat post at least when the bicycle trailer hitch is mounted to the bicycle seat post;
   an over center latch coupled to the first segment and detachably coupled to the second segment, the over center latch being movable to first mounting position and to a second detached position, wherein in in the first mounting position the over center latch couples the first and second segments together and also couples the interior side surfaces of the first, second, and at least one intermediate segment to the bicycle seat post to mount the bicycle trailer hitch to the bicycle seat post, wherein in the second detached position the over center latch decouples the first and second segments from one another such that the first, second and at least one intermediate segment are free to pivot clear of the bicycle seat post to allow removal of the bicycle trailer hitch from the seat post; and a trailer towing arm supporting projection projecting outwardly from the first, second and the at least one intermediate segment; and a trailer towing arm pivot carried by the trailer towing arm supporting projection, the trailer towing arm pivot being adapted to pivotally couple the trailer towing arm to the bicycle trailer hitch during towing of the bicycle trailer.

2. A bicycle trailer hitch according to claim 1 wherein there is only one intermediate segment.

3. A bicycle trailer hitch according to claim 1 wherein the trailer towing arm pivot comprises a pivot pin projecting upwardly from the towing arm supporting projection for insertion through an opening through the end portion of the trailer towing arm to pivotally couple the trailer towing arm to the bicycle trailer hitch, a trailer towing arm capture member slidably coupled to the towing arm supporting projection and slidable between a trailer towing arm captured position and a trailer towing arm released positions, wherein in the trailer towing arm capture position the trailer towing arm capture member is slid relative to the towing arm supporting projection to a position that overlies a portion of the end portion of the trailer towing arm to thereby retain the trailer towing arm coupled to the bicycle trailer hitch, and wherein in the trailer towing arm released position the trailer towing arm capture member is slid to a position that does not overlie a portion of the trailer towing arm to thereby allow decoupling of the trailer towing arm from the pivot pin and thereby from the bicycle trailer hitch.

4. A bicycle trailer hitch according to claim 3 comprising a biasing spring coupled to the towing arm supporting projection and to the trailer towing arm capture member to bias the trailer towing arm capture member to the trailer towing arm captured position.

5. A bicycle trailer hitch according to claim 1 wherein the first segment comprises first and second end portions, the second end portion of the first segment being pivoted to at least one intermediate segment, wherein the second segment comprises first and second end portions, the second end portion of the second segment being pivoted to at least one intermediate segment, the over center latch comprising a lever comprising a proximal end and a distal end, the proximal end being pivoted to the first end of the first segment for pivoting about a first latch pivot axis, a latching member having first and second latching member end portions, the first latching member end portion being pivotally coupled to the lever at a location spaced from the first latch pivot axis for pivoting about a second latch pivot axis that is parallel to the first latch pivot axis, the latching member projecting from the lever toward the first end portion of the second segment, the second latching member end portion being adapted to detachably engage the first end portion of second segment, whereby upon rotating the distal end of the lever about the first pivot axis and away from the first end portion of the second segment to a lever latching position, the first end portion of the second segment is drawn toward the first end portion of the second segment and the second latch pivot axis is positioned at an over center position with the first latch pivot axis positioned between the first end portion of the second segment and the second latch pivot axis.

6. A bicycle trailer hitch according to claim 5 wherein the first latching member end portion is threadedly connected to the lever, wherein rotation of the latching member in a first direction increases the distance along the latching member from the second latch pivot axis to the first end portion of the second segment, and wherein rotation of the latching member in a second direction decreases the distance along the latching member from the second latch pivot axis to the first end portion of the second segment, whereby rotating the latching member adjusts the distance between the first end portion of the first segment and the first end portion of the second segment.

7. A bicycle trailer hitch according to claim 6 wherein the first end portion of the first segment defines a slot positioned to receive the latching member therein as the lever is moved to the lever latching position, and wherein the latching member is t-shaped and comprises a leg that terminates at the first latching member end portion and a cross portion at the second latching member end portion, the first end portion of the second segment comprising a slot positioned to receive a portion of the leg and with the cross portion engaging an engagement surface of the first end portion of the second segment that faces away from the second latch pivot axis.

8. A bicycle trailer hitch according to claim 7 wherein the engagement surface is concave.

9. A bicycle trailer hitch according to claim 1 wherein the interior side surfaces of the first, second and at least one intermediate segments are arcuate.

10. A bicycle trailer hitch according to claim 1 wherein the towing arm supporting projection comprises a platform that projects outwardly from an exterior side surface of the first segment.

11. A bicycle trailer hitch according to claim 10 wherein the towing arm supporting platform projects an upward angle from the first segment.

12. A bicycle trailer hitch for mounting to a bicycle seat post and for coupling a trailer towing arm and towed trailer to the bicycle seat post, the bicycle trailer hitch comprising;

a first segment comprising a first body comprising a first segment first and second ends and a first segment interior side surface that faces the bicycle seat post when the hitch is mounted to the bicycle seat post;

a second segment comprising a second body with second segment first and second ends and a second segment interior side surface that faces the bicycle seat post when the bicycle trailer hitch is mounted to the bicycle seat post;

an intermediate segment comprising an intermediate body with intermediate segment first and second ends and an intermediate segment interior side surface that faces the bicycle seat post when the bicycle trailer hitch is mounted to the bicycle seat post;

wherein the first segment second end is pivoted to the intermediate segment first end and the second segment second end is pivoted to the intermediate segment second end to form a chain of three pivotally interconnected segments;

a lever comprising a proximal end and a distal end, a first lever pivot that pivots the proximal end of the lever to the first segment first end at a first lever pivot location, a latching member having first and second latching member end portions, a second lever pivot that pivots the first latching member end portion to the lever at a second lever pivot location spaced from the first lever first pivot location, the second lever end portion being positioned between the proximal and distal ends of the lever, the second latching member end being adapted to detachably engage the second segment first end, whereby upon rotating the distal end of the lever about the first lever pivot and away from the second segment first end portion to an over center lever latching position, the second segment first end is drawn toward the first segment first end and the first lever pivot location is positioned between the second segment first end and the second pivot location; and a trailer towing arm pivot coupled to one of the first, second and intermediate segments, the trailer towing arm pivot being adapted to pivotally couple the trailer towing arm to the bicycle trailer hitch during towing of the bicycle trailer.

13. A bicycle trailer hitch according to claim 12 wherein the first segment second end is pivoted to the intermediate segment first end for pivoting about a first upright axis, the second segment second end is pivoted to the intermediate segment second end for pivoting about a second upright pivot axis, wherein the first lever pivot pivots the proximal end of the lever to the first segment first end for pivoting about a first lever pivot axis, wherein the second lever pivot that pivots the first latching member end portion to the lever for pivoting about a second upright lever pivot axis, and wherein the first pivot axis, the second pivot axis, the first lever pivot axis and the second lever pivot axis are parallel.

14. A bicycle trailer hitch according to claim 12 wherein the first segment interior side surface, the second segment interior side surface and the third segment interior side surface each comprise an arcuate or a concave surface.

15. A bicycle trailer hitch according to claim 12 wherein the first latching member end portion is threadedly and pivotally coupled to the lever at the second lever pivot location.

16. A bicycle trailer hitch according to claim 12 comprising a platform projecting outwardly from said one of the first segment, second segment and intermediate segment to which the trailer arm pivot is coupled, wherein the trailer arm pivot comprises a pivot pin projecting upwardly from the platform for insertion through an opening through the end portion of the trailer towing arm to thereby pivotally couple the trailer towing arm to the bicycle trailer hitch, a trailer towing arm capture member slidably coupled to the platform and slidable between a trailer towing arm captured position and a trailer towing arm released position, wherein in the trailer towing arm capture position the trailer arm capture member is slid relative to the platform to a position that overlies a portion of the end portion of the trailer towing arm to thereby retain the trailer towing arm coupled to the bicycle trailer hitch, and wherein in the trailer towing arm released position the trailer towing arm capture member is slid to a position that does not overlie a portion of the trailer towing arm to thereby allow decoupling of the trailer towing arm from the pivot pin and thereby from the bicycle trailer hitch.

17. A bicycle trailer hitch according to claim 16 comprising a biasing spring coupled to the towing arm supporting platform and to the trailer towing arm capture member to bias the trailer towing arm capture member to the trailer towing arm captured position.

18. A bicycle trailer hitch according to claim 17 wherein the towing arm supporting platform projects outwardly from the second segment.

19. A bicycle trailer hitch according to claim 12 comprising a first cushion carried by the first segment and projecting from first segment interior side surface toward the bicycle seat post when the hitch is mounted to the bicycle seat post, a second cushion carried by the second segment and projecting from the second segment interior side surface toward the bicycle seat post when the hitch is mounted to the bicycle seat post, and a third cushion carried by said intermediate segment and projecting from the intermediate segment interior side toward the bicycle seat post when the hitch is mounted to the bicycle seat post.

20. A bicycle trailer hitch for mounting to a bicycle seat post and for coupling a trailer towing arm and towed trailer to the bicycle seat post, the bicycle trailer hitch comprising;

a plurality of pivotally interconnected segments comprising a first segment, a second segment and one intermediate segment between the first and second segments, each segment comprising a bicycle post engaging interior side surface positioned to engage the bicycle seat post at least when the bicycle trailer hitch is mounted to the bicycle seat post;

an over center latch coupled to the first segment and detachably coupled to the second segment, the over center latch being movable to first mounting position and to a second detached position, wherein in in the first mounting position the over center latch couples the first and second segments together and also couples the interior side surfaces of the first, second, and said one intermediate segment to the bicycle seat post to mount the bicycle trailer hitch to the bicycle seat post, wherein in the second mounting position the over center latch decouples the first and second segments from one another such that the first, second and said one intermediate segment are free to pivot clear of the bicycle seat post to allow removal of the bicycle trailer hitch from the seat post;

a trailer towing arm supporting platform projecting outwardly from one of the first, second and said one intermediate segment; and a trailer towing arm pivot carried by the trailer towing arm supporting platform, the trailer towing arm pivot being adapted to pivotally couple the trailer towing arm to the bicycle trailer hitch during towing of the bicycle trailer;

wherein the trailer towing arm pivot comprises a pivot pin projecting upwardly from the towing arm supporting platform for insertion through an opening through the end portion of the trailer towing arm to pivotally couple the trailer towing arm to the bicycle trailer hitch, a trailer towing arm capture member slidably coupled to the towing arm supporting platform and slidable between a trailer towing arm captured position and a trailer towing arm released positions, wherein in the trailer towing arm capture position the trailer towing arm capture member is slid relative to the towing arm supporting platform to a position that overlies a portion of the end portion of the trailer towing arm to thereby retain the trailer towing arm coupled to the bicycle trailer hitch, and wherein in the trailer towing arm released position the trailer towing arm capture member is slid to a position that does not overlie a portion of the trailer towing arm to thereby allow decoupling of the trailer towing arm from the pivot pin and thereby from the bicycle trailer hitch;

a biasing spring coupled to the towing arm supporting platform and to the trailer towing arm capture member to bias the trailer towing arm capture member to the trailer towing arm captured position;

wherein the first segment comprises first and second end portions, the second end portion of the first segment being pivoted to said one intermediate segment and the second segment comprises first and second end portions, the second end portion of the second segment being pivoted to said one intermediate segment, the over center latch comprising a lever comprising a proximal end and a distal end, the proximal end being pivoted to the first end of the first segment for pivoting about a first latch pivot axis, a latching rod having first and second rod end portions, the first rod end portion being pivotally coupled to the lever at a location spaced from the first latch pivot axis for pivoting about a second latch pivot axis that is parallel to the first latch pivot axis, the latching rod projecting from the lever toward the first end portion of the second segment, the second rod end portion being adapted to detachably engage the first end portion of second segment, whereby upon rotating the distal end of the lever about the first pivot axis and away from the first end portion of the second segment to a lever latching position, the first end portion of the second segment is drawn toward the first end portion of the second segment and the second latch pivot axis is positioned at an over center position with the first latch pivot axis positioned between the first end portion of the second segment and the second latch pivot axis;

wherein the first latching rod end portion is threadedly connected to the lever, wherein rotation of the latching rod in a first direction increases the distance along the latching rod from the second latch pivot axis to the first end portion of the second segment, and wherein rotation of the latching rod in a second direction decreases the distance along the latching rod from the second latch pivot axis to the first end portion of the second segment, whereby rotating the latching rod adjusts the distance between the first end portion of the first segment and the first end portion of the segment;

wherein the first end portion of the first segment defines a slot positioned to receive the latching rod therein as the lever is moved to the lever latching position, and wherein the latching rod is t-shaped have having a leg that terminates at the first rod end portion and a cross portion at the second rod end portion, the first end portion of the second segment comprising a slot positioned to receive a portion of the leg and with the cross portion engaging an engagement surface of the first end portion of the second segment that faces away from the second latch pivot axis;

wherein the interior side surfaces of the first, second and said one intermediate segments comprise arcuate surfaces;

a first cushion carried by the first segment and projecting from the interior side surface of the first segment toward the bicycle seat post when the hitch is mounted to the bicycle seat post, a second cushion carried by the second segment and projecting from the interior side surface of the second segment toward the bicycle seat post when the hitch is mounted to the bicycle seat post, a third cushion carried by said one intermediate segment and projecting from the interior side surface of said one intermediate segment toward the bicycle seat post when the hitch is mounted to the bicycle seat post; and wherein the towing arm supporting platform projects an upward angle from the first segment.

\* \* \* \* \*

UNITED STATES PATENT AND TRADEMARK OFFICE
CERTIFICATE OF CORRECTION

PATENT NO. : 11,046,385 B1
APPLICATION NO. : 16/508095
DATED : June 29, 2021
INVENTOR(S) : Anderegg et al.

Page 1 of 1

It is certified that error appears in the above-identified patent and that said Letters Patent is hereby corrected as shown below:

In the Claims

Column 12, Line 58, Claim 1: "wherein in in the" should read --wherein in the--.

Column 18, Line 4, Claim 20: "t-shaped have having" should read --t-shaped having--.

Signed and Sealed this
Twenty-first Day of September, 2021

Drew Hirshfeld
*Performing the Functions and Duties of the
Under Secretary of Commerce for Intellectual Property and
Director of the United States Patent and Trademark Office*